(12) United States Patent
Yang

(10) Patent No.: US 10,317,683 B2
(45) Date of Patent: Jun. 11, 2019

(54) HEAD-MOUNTED ELECTRONIC DEVICE

(71) Applicant: SHENZHEN ROYOLE TECHNOLOGIES CO., LTD., Shenzhen, Guangdong (CN)

(72) Inventor: Songling Yang, Guangdong (CN)

(73) Assignee: SHENZHEN ROYOLE TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/567,706

(22) PCT Filed: Jul. 30, 2015

(86) PCT No.: PCT/CN2015/085637
§ 371 (c)(1),
(2) Date: Oct. 19, 2017

(87) PCT Pub. No.: WO2017/015968
PCT Pub. Date: Feb. 2, 2017

(65) Prior Publication Data
US 2018/0120571 A1 May 3, 2018

(51) Int. Cl.
G02B 27/01 (2006.01)
H04R 1/02 (2006.01)
(Continued)

(52) U.S. Cl.
CPC ..... *G02B 27/0176* (2013.01); *G02B 27/0101* (2013.01); *H04R 1/028* (2013.01);
(Continued)

(58) Field of Classification Search
CPC ............ G02B 27/0176; G02B 27/0101; G02B 2027/0118; G02B 2027/014;
(Continued)

(56) References Cited

U.S. PATENT DOCUMENTS 8,305,297 B2 11/2012 Sugihara et al.
10,055,887 B1* 8/2018 Gil .................. G06T 19/006
(Continued)

FOREIGN PATENT DOCUMENTS

CN 101320131 A 12/2008
CN 102023383 A 4/2011
(Continued)

OTHER PUBLICATIONS

International Search Report dated Apr. 5, 2016 for corresponding International Application No. PCT/CN2015/085637, filed Jul. 30, 2005.
(Continued)

*Primary Examiner* — Jefferey F Harold
*Assistant Examiner* — Omer Khalid
(74) *Attorney, Agent, or Firm* — David D. Brush; Westman, Champlin & Koehler, P.A.

(57) ABSTRACT

A head-mounted electronic device includes two earphones, one covering member, and two display members. The covering member is connected to the two earphones and is configured to cover a space in front of the eyes of a user. The covering member includes a dimming portion that is located in front of the eyes and whose transparency can be changed. Each display member is rotatably connected to one corresponding earphone and can rotate to a first position in front of the eyes and a second position staggered the eyes. At the first position, the dimming part is in a light shading state and display members project images to the eyes of the user. At the second position, the dimming element is in a light transmission state and the display members project images to the dimming portion, so that the user can see external scenes and the projected images.

20 Claims, 4 Drawing Sheets

(51) Int. Cl.
*H04R 1/10* (2006.01)
*H04R 5/033* (2006.01)

(52) U.S. Cl.
CPC ......... *H04R 1/1008* (2013.01); *H04R 1/1025* (2013.01); *H04R 5/0335* (2013.01); *G02B 2027/014* (2013.01); *G02B 2027/0118* (2013.01); *G02B 2027/0156* (2013.01); *G02B 2027/0161* (2013.01); *H04R 5/033* (2013.01); *H04R 2499/15* (2013.01)

(58) Field of Classification Search
CPC .... G02B 2027/0156; G02B 2027/0161; H04R 1/028; H04R 1/1025
USPC ........................... 351/158; 348/552; 345/7, 8
See application file for complete search history.

(56) References Cited

U.S. PATENT DOCUMENTS

| | | | |
|---|---|---|---|
| 2008/0158506 A1* | 7/2008 | Fuziak | G02B 27/0172 351/158 |
| 2011/0273365 A1* | 11/2011 | West | G02B 27/0176 345/8 |
| 2013/0195307 A1 | 8/2013 | Mizuno et al. | |
| 2013/0237146 A1* | 9/2013 | Serota | G02B 27/017 455/12.1 |
| 2013/0249778 A1 | 9/2013 | Morimoto | |
| 2013/0249787 A1 | 9/2013 | Morimoto | |
| 2013/0300766 A1 | 11/2013 | Mukawa | |
| 2014/0285403 A1 | 9/2014 | Kobayashi | |
| 2014/0340286 A1* | 11/2014 | Machida | G02B 26/0833 345/8 |
| 2015/0102983 A1 | 4/2015 | Serota | |
| 2015/0309316 A1* | 10/2015 | Osterhout | G06F 3/012 345/8 |
| 2016/0212350 A1 | 7/2016 | Rousseau et al. | |
| 2016/0241947 A1 | 8/2016 | Degraye et al. | |
| 2018/0045911 A1* | 2/2018 | Yang | G02B 7/12 |
| 2018/0063626 A1* | 3/2018 | Pong | H04R 1/1066 |
| 2018/0074549 A1* | 3/2018 | Chen | G06F 1/163 |

FOREIGN PATENT DOCUMENTS

| | | |
|---|---|---|
| CN | 102421046 A | 4/2012 |
| CN | 103246062 A | 8/2013 |
| CN | 103323948 A | 9/2013 |
| CN | 103323949 A | 9/2013 |
| CN | 103383491 A | 11/2013 |
| CN | 103389580 A | 11/2013 |
| JP | 2861162 B2 | 2/1999 |
| JP | 2000111828 A | 4/2000 |
| JP | 2013200325 A | 10/2013 |
| WO | 9521395 A1 | 8/1995 |
| WO | 2008083170 A2 | 7/2008 |

OTHER PUBLICATIONS

Written Opinion of the International Searching Authority dated Apr. 5, 2016 for corresponding International Application No. PCT/CN2015/085637, filed Jul. 30, 2015.
International Search Report dated Apr. 7, 2016 for corresponding International Application No. PCT/CN2015/085638, filed Jul. 30, 2015.
Written Opinion of the International Searching Authority dated Apr. 7, 2016 for corresponding International Application No. PCT/CN2015/085638, filed Jul. 30, 2015.
English translation of the Written Opinion of the International Searching Authority dated Apr. 5, 2016 for corresponding International Application No. PCT/CN2015/085637, filed Jul. 30, 2015.
English translation of the Written Opinion of the International Searching Authority dated Apr. 7, 2016 for corresponding International Application No. PCT/CN2015/085638, filed Jul. 30, 2015.
English translation of an Office Action, dated Jun. 14, 2018 from the Korean Intellectual Property Office for Korean Application No. 20177025722.
Office Action dated Oct. 5, 2018 from the United States Patent and Trademark Office for corresponding U.S. Appl. No. 15/567,502.
Chinese Office Action dated Nov. 26, 2018 for Chinese Application No. 201580002978.4.
Korean Office Action dated Dec. 20, 2018 for Korean Application No. 10-2017-7025722.

* cited by examiner

HEAD-MOUNTED ELECTRONIC DEVICE

CROSS-REFERENCE TO RELATED APPLICATION

The present application is a national phase entry under 35 USC § 371 of International Application PCT/CN2015/085637, filed Jul. 30, 2015, published as WO 2017/015968 on Feb. 2, 2017, not in English, the entire contents of which are incorporated herein by reference.

FIELD

The present disclosure relates to a head-mounted electronic device, and more particularly to a head-mounted electronic device having an immersive type display mode and a head-up type display mode.

BACKGROUND

Currently, a head-mounted electronic device is a near-eye display device, which produces an image and projects it to eyes of a user, such that the user may see an enlarged virtual image, thereby acquiring a display effect of a larger area. There are two types of head-mounted electronic device including a see-through type and an immersive type. The see-through type head-mounted electronic device may allow the user to see a displayed image superimposed on an actual scene, and the user who wears the immersive type head-mounted electronic device may only see the displayed image. In the above two types, the former is suitable for purpose of assisting reality, for example, superposing of a branch road sign with the corresponding road when applied to navigation, and the latter is more suitable for making the user enter a created environment, for example, enter a given game scene. When wearing the immersive type head-mounted electronic device, if the user wants to see the external environment, he generally needs to take off the electronic device, which is inconvenient.

SUMMARY

On that account, a head-mounted electronic device which is convenient for a see-through type display and an immersive type display is provided by the present disclosure.

The head-mounted electronic device provided by an embodiment of the present disclosure includes: two earphones; one covering member connecting to the two earphones and configured to cover space in front of eyes of a user, the covering member including a dimming part with a changeable transparency located in front of the eyes; and two display members, each display member being rotatably connecting to one corresponding earphone and capable of rotating to a first position located in front of the eyes and a second position staggered the eyes; in which, at the first position, the dimming part is in a light shielding state and the display members project an image to the eyes of the user; at the second position, the dimming part is in a light transmitting state and the display members project the image to the dimming part, allowing the user to see external scenes and the projected image.

In the present disclosure, the user can easily switch between watching the image displayed by the head-mounted electronic device and watching the scene of an external environment of the head-mounted electronic device without taking off the head-mounted electronic device, thus greatly facilitating the user, thereby improving experience feeling of the user.

BRIEF DESCRIPTION OF THE DRAWINGS

The following drawings are used for describing embodiments of the present disclosure in detail in combination with specific embodiments. It should be understood that, elements shown in the drawings do not represent their actual dimension and proportional relation, and are just intended to clearly explain schematic views which are shown out, and could not be construed to limit the present disclosure.

DETAILED DESCRIPTION

In order to make objectives, technical solutions and advantages of the present disclosure more clear and apparent, the present disclosure will be further described in detail in combination with multiple embodiments and drawings in the following. It should be understood that, the specific embodiments described herein are just used to explain the present disclosure, and are not used to limit the present disclosure.

Figure 1:
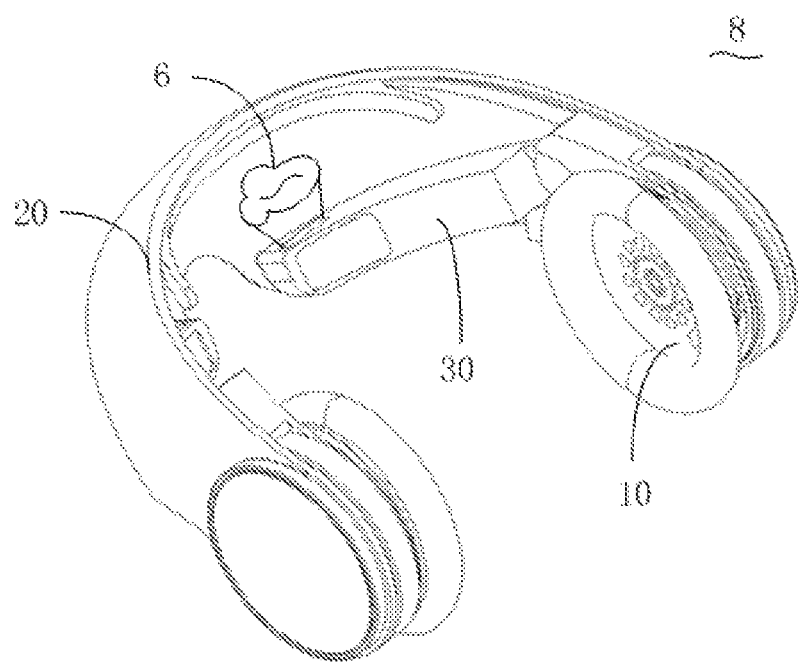
FIG. 1 is a schematic view of a head-mounted electronic device provided by an embodiment of the present disclosure, in which, each display member of the head-mounted electronic device is located at a second position.

Referring to FIG. 1, a head-mounted electronic device 8 is provided by an embodiment of the present disclosure and can be a head-mounted video player, a head-mounted gaming device or a head-mounted navigation device and the like. The head-mounted electronic device 8 includes two earphones 10, one covering member 20 connecting the two earphones 10 and two display members 30 rotatably connecting to the earphones 10. The covering member 20 is configured to provide the two earphones 10 with a clamping force to clamp ears of a user, when the user wears the head-mounted electronic device 8, such that the user can steadily wear the head-mounted electronic device 8. The earphones 10 and the display members 30 are respectively configured to output sounds and images to the user, thereby achieving audio and visual functions.

Figure 2:
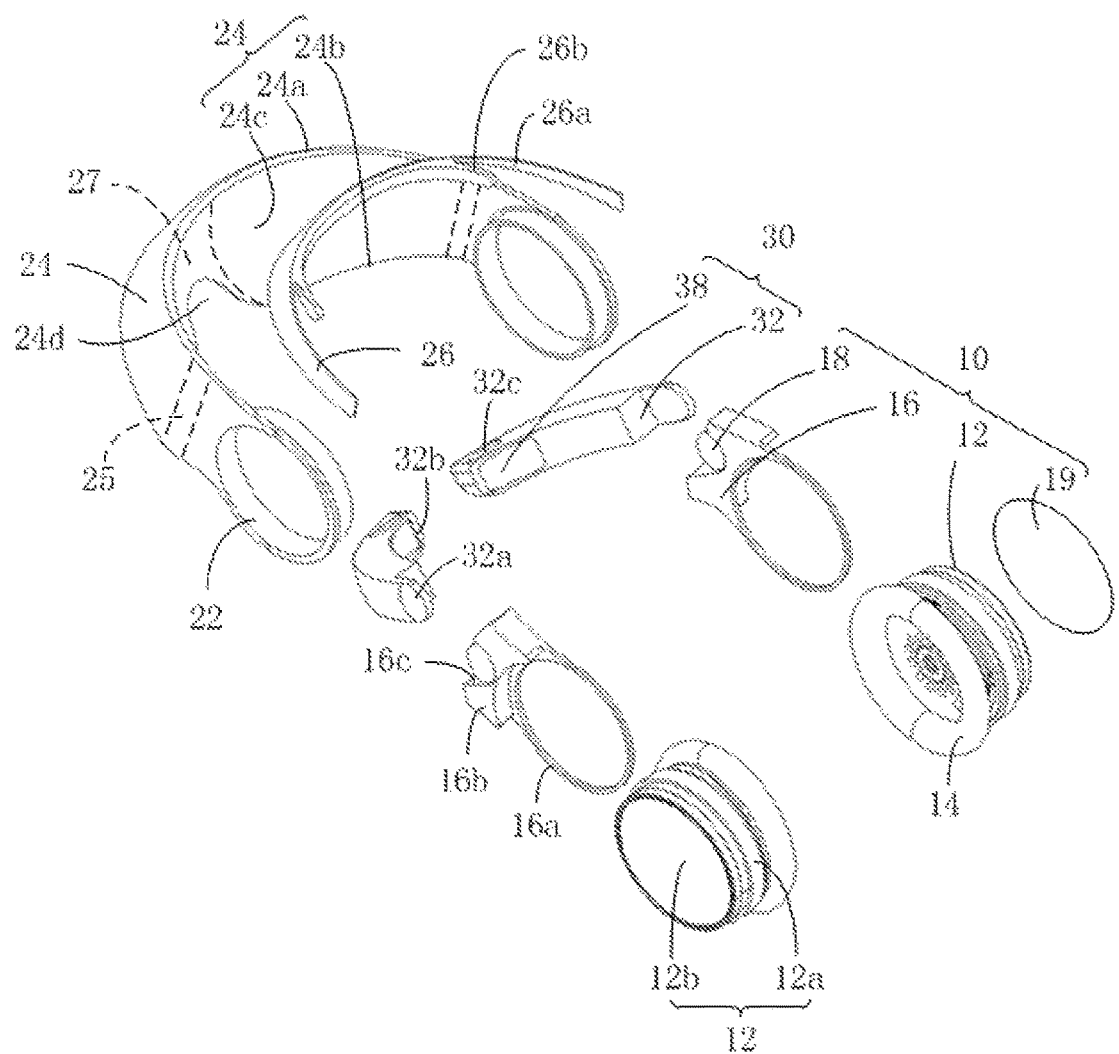
FIG. 2 is a partially exploded view of the head-mounted electronic device of FIG. 1.

Referring to FIG. 2, each earphone 10 includes one housing 12, one earphone cover 14, one loudspeaker (not shown in the drawings), one mounting member 16 and one power source 18 disposed to the mounting member 16. The housing 12 is substantially cup-shaped, and includes a cylinder-shaped wall 12a and a side wall 12b. The side wall 12b seals the cylinder-shaped wall 12a. The housing 12 defines an accommodating space and the loudspeaker is accommodated in the accommodating space. The earphone cover 14 is fixed to a side of the cylinder-shaped wall 12a opposite to the side wall 12b. There is no big difference between the structure of the earphone 10 and that of an existing earphone, which will not be elaborated in the present description. The mounting member 16 includes one ring part 16a and one mounting part 16b. The ring part 16a is sleeved over the cylinder-shaped wall 12a of the earphone 10. So that the ring part 16a connects to the earphone 10, and the mounting part 16b locates at one side of the ring part 16a and defines one accommodating groove 16c thereon. In the other embodiments, the mounting member 16 may also be integrally formed with the earphone 10, which is not limited to the assembly method of the present embodiment. In the present embodiment, the power source 18 is an electric motor and a gear set essentially configured for reducing an output rotational speed while improving an output torque. The power source 18 is accommodated in the accommodating groove 16c. The side wall 12b is provided with a touch device 19. The touch device can sense a touch operation from the user. Therefore, the user can apply required operations to the whole head-mounted electronic device 8 through the touch device 19.

The covering member 20 connects to the two earphones 10 and covers the space in front of eyes of the user. The covering member 20 includes a dimming part 24. The dimming part 24 locates in front of eyes and can change the transparency. Specifically, in the present embodiment, the covering member 20 is substantially C-shaped and includes two connecting parts 22 and the dimming part 24. The two connecting parts 22 respectively locate at two sides of a C-shaped opening. The dimming part 24 locates between the connecting parts 22 and forms the C shape. In the present embodiment, each of the connecting parts 22 is ring-shaped, and sleeved over a cylinder-shaped wall 12a of the earphone 10, so the connecting parts 22 connect with the earphone 10. The dimming part 24 includes an upper part 24a, a lower part 24b and a middle part 24c. The middle part 24c locates between the upper part 24a and the lower part 24b. The upper part 24a is adjacent to forehead of the user and the lower part 24b is far away from the forehead when the user wears the head-mounted electronic device 8. The middle part 24c protrudes outwards in a direction of departing away from the earphone 10 relative to the upper part 24a and the lower part 24b. A middle portion of the lower part 24b concaves towards the middle part 24c, thereby one notch 24d is formed in the middle portion of the lower part 24b. When the user wears the head-mounted electronic device, the nose of the user abuts against an upper side of the notch 24d, thereby supporting the covering member 20. It could be understood that, in the other embodiments, in order to be suitable for more users, retractable adjusting parts 25 can be further provided between the dimming part 24 and the two connecting parts 22, as shown in FIG. 2, such that the distance between the dimming parts 24 and the two connecting parts 22 can be adjustable.

The transparency of the dimming part 24 can be changed. In particular, the dimming part 24 can be made from an electrochromic element, which generally includes, in sequence, a first transparent base material, a first transparent conducting layer, an electrochromic layer, an electrolyte layer, an ion storage layer, a second transparent conducting layer and a transparent base material. When a certain voltage is applied between the two transparent conducting layers, an oxidation reduction reaction is took place in the electrochromic layer material under the action of the voltage, and the color of the dimming part 24 is changed accordingly. When the voltage recedes, the electrochromic layer can be recovered to a far state. The principles and specific implementation are known by those skilled in the art, which will not be elaborated in the present description. Thus, by controlling the voltage applied on the dimming part 24, the electrochromic element can be in a light shielding state or a light transmitting state. In the light shielding state, most external light can't pass through; in contrast, in the light transmitting state, the most external light can pass through the electrochromic element. Certainly, in the present disclosure, in order to change transparency, the dimming part 24 may also be replaced by other elements having the same function, for example, the dimming part 24 is made from a liquid crystal display screen having a transparent TTF base, and by adjusting the state of the liquid crystal, the liquid crystal display screen may achieve the light shielding effect and light transmitting effect as the above electrochromic element. In the present disclosure, the dimming part 24 located in front of the left eye and the right eye can be configured as a whole piece as shown in FIG. 1, as well as can be configured as two separate pieces connected by a connecting member 27 as shown in FIG. 2. The connecting member 27 is made from a material having no dimming function, such as plastic or metal.

Figure 3:
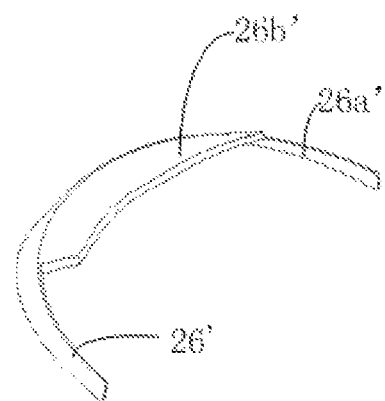
FIG. 3 is a schematic view of another embodiment of a contact member of FIG. 1.

The covering member 20 further includes a contact member 26. The contact member 26 can contact with the forehead of the user, and includes a fixing part 26a fixed to the upper part 24a and a contact part 26b extending from a middle position of the fixing part 26a towards the forehead of the user. The contact part 26b has an elastic deformation capacity, and an end width of the contact part 26b is smaller than a forehead width of the user, such that when the user wears the head-mounted electronic device, the contact part 26b is deformed, thus generating a greater frictional force with the forehead, which is convenient for the user to wear. At the same time, a surface of the contact part 26b facing the user can also be provided with a soft fabric such as a sponge, so as to make more comfortable when the user wears and increase the light shielding effect. It could be understood that, in order to achieve that the covering member 20 has a better light shielding effect, a contact member 26' may also be that as shown in FIG. 3 A difference between the contact member 26' and the contact member 26 is that, a contact part 26b' is plate-shaped and extends obliquely from a fixing part 26a' to the forehead of the user. When the head-mounted electronic device 8 is worn, the contact part 26b' abuts against the forehead of the user, thereby preventing the covering member 20 from gliding down effectively, meanwhile shielding the light effectively. Certainly, the lower part 24b can also provide a similar contact member. The contract member can contact with the user face and take the light shielding effect.

Figure 6:
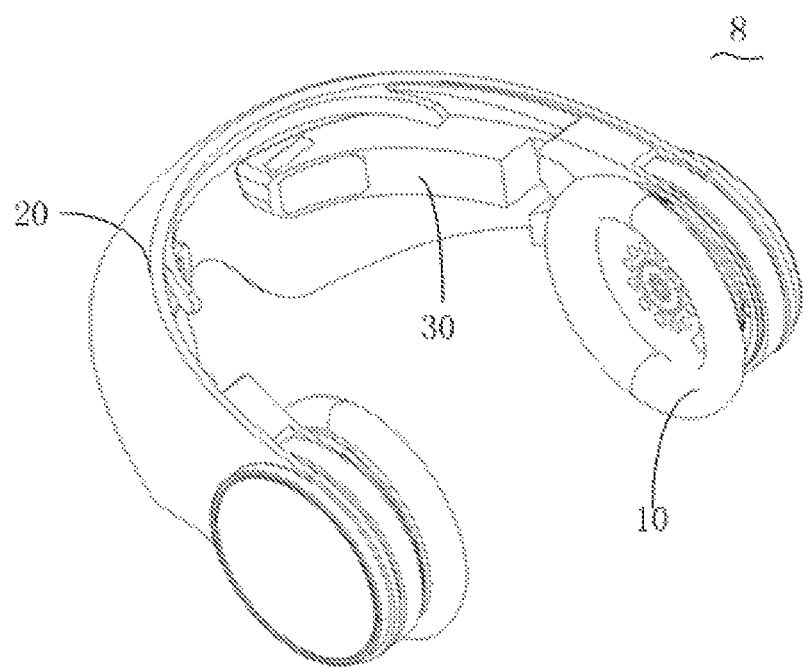
FIG. 6 is a schematic view illustrating the display member of FIG. 1 is located at a first position.

Each of the display members 30 is rotatably connected to a corresponding earphone 10, and can be rotated to a first position locating in front of the eyes, as shown in FIG. 6, and a second position staggering the eyes, as shown in FIG. 1. At the first position, the dimming part 24 is in the light shielding state and the display members 30 project the image to the eyes of the user. At the second position, the dimming part 24 is in the light transmitting state and the display members 30 project the image to the dimming part 24, such that the user may see the external scenes and the projected image. Specifically, in the present embodiment, the display member 30 includes a case 32 and an optical display module 38 accommodated in the case 32. A side 32a of the case 32 is connected to the power source 32, and the other side defines a first light outlet 32b and a second light outlet 32c through which light of the optical display module 38 passes. The first light outlet 32b faces towards the eyes of the user, and the second light outlet 32c faces towards the forehead of the user, i.e., faces upwards. Thus, while the power source 18 actuates a small angle, the side at which the light outlet 32b is located may move by a large radian, thereby facilitating the side at which the light outlet 32b locates to quick switch between the first position and the second position.

Figure 4:
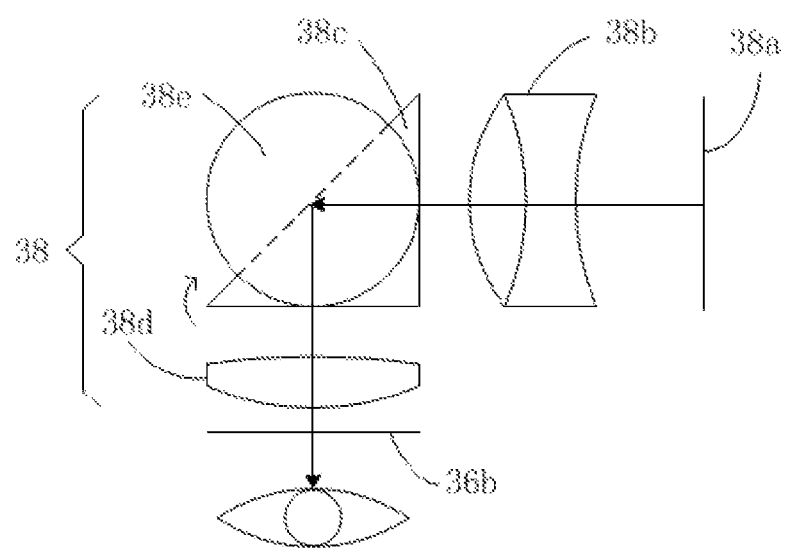
FIG. 4 is a schematic view of a light path of an immersive projection achieved by an optical display module of the display member of FIG. 1.

Referring to FIG. 4, the optical display module 38 includes one image source 38a, one first lens module 38b, one rotatable refractive lens module 38c, one second lens module 38d and one third lens module 38e. The image source 38a, the first lens module 38b, the refractive lens module 38c and the second lens module 38d are located in a first light path; when the refractive lens module 38c is rotated, the image source 38a, the first lens module 38b, the refractive lens module 38c and the third lens module 38e are located in a second light path. The refractive lens module 38c can be actuated to be rotated by a motor (not shown in the drawings). The image source 38a can be configured as an LCD display module or an OLED display module, which is generally a micro display module with a high displaying density. The refractive lens module 38c is configured to reflect the image lights emitted from the image source 38a, so as to change a direction of the path of the image lights, so, the first and second lens modules 38b and 38d need not to be overlaid in the same direction, and an interior space of the case 32 can be flexibly used. The first and second lens modules 38b and 38d are configured to suitably refract image lights emitted from the image source 38a, such that the user may clearly see a visual image with a set dimension.

Figure 5:
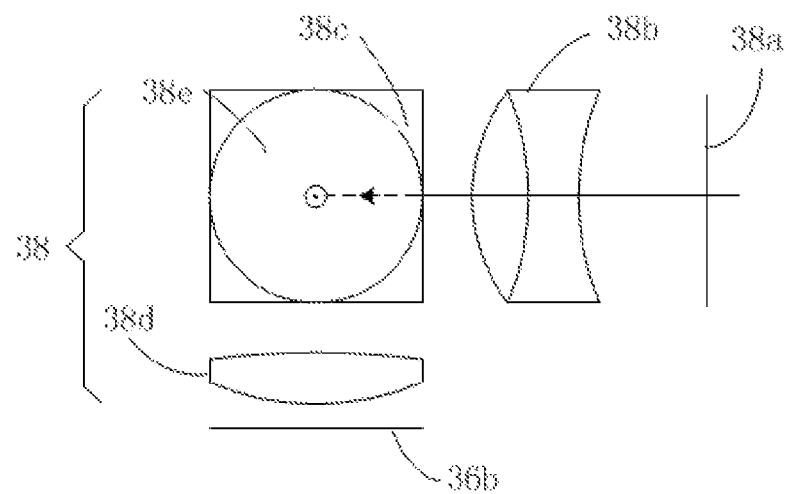
FIG. 5 is a schematic view of a light path of a see-through projection achieved by an optical display module of the display member of FIG. 1.

Referring to FIG. 5, when the see-through projection is needed, the refractive lens module 38c is rotated by a certain angle, for example, the refractive lens module 38c is reversely rotated by 90 degrees along an arrow shown in FIG. 4, such that the image lights are projected upwards and emitted out through the second light outlet 32c, the light path is shown in FIG. 5. In this case, the image lights are projected on the dimming part to form an image 6 shown in FIG. 1. Specific structure and the amount of lenses of the first and second lens modules 38b and 38d and the refractive lens module 38c are not limited to that shown in FIG. 4, and could be determined according to requirements of the specific design. It could be understood that, in the other embodiments, rotation of the case 32 can be achieved by means of manual operations, at the same time the case 32 directly connects to the mounting part 16b. It could be understood that, in the other embodiments, the second light outlet 32c can also face a jaw of the user, i.e., face downwards, which may also achieve the see-through projection.

Referring to FIGS. 6, 1 and 2, when the head-mounted electronic device 8 is to be worn, the two earphones 10 are firstly stretched outwards, the head-mounted electronic device 8 is then worn on user head from the front of the face, and the earphone covers 14 cover ears of the user. The display member 30 is located at the first position in right front of eyes, and the dimming part 24 is in the light shielding state, at this time, the display member 30 projects the image lights to eyes of the user, so the user may see an enlarged virtual image of the image. When the user needs to see a scene outside of the covering member 20, the power source 32 controls the case 32 to rotate downwards to the second position which is below eyes and may not influence sight of eyes, in the case the dimming part 24 turns to be in the light transmitting state, allowing the exterior light to enter eyes of the user. When the refractive lens module 38c is rotated by the certain angle, the image lights emitted from the image source 38a are emitted out through the second light outlet 32c along the light path as shown in FIG. 5, and project t to the dimming part 24 and refract to eyes of the user, in this case, the user may see superimposition of the projected image with the external scene, thereby achieving the see-through projection. It should be noted that, a control of switching of the display member 30 between the first position and the second position, a control of rotation of the refractive lens module 38c, a control of switching of the dimming part 24 between the light shielding state and the light transmitting state, a control of display of images produced by the display member 30 and a system control such as volume and progress adjustments performed during the process of image watching all can be implemented by operating the touch device 19 correspondingly, and a central processing unit of the head-mounted electronic device 8 and the corresponding functional circuit (not shown in the drawings) respond the operation to complete the above control. Thus, the user may easily switch between watching the image displayed by the head-mounted electronic device 8 and the scene of an external environment of the head-mounted electronic device 8 without taking off the head-mounted electronic device 8, thus greatly facilitating the user, thereby improving experience feeling of the user.

In the description of the present invention, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, the term "a plurality of" means two or more than two, unless specified otherwise.

In the description of the present invention, unless specified or limited otherwise, the terms "mounted," "connected," "coupled," "fixed" and the like are used broadly, and can be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

The above are just preferable embodiments of the present disclosure, and should not be used to limit the present disclosure. Any modifications, equivalent replacement and improvement within the spirit and principle of the present disclosure should be comprised in the protection scope of the present disclosure.

What is claimed is:

1. A head-mounted electronic device comprising:
   two earphones;
   one covering member connecting to the two earphones and covering front space of user eyes, wherein the covering member comprises a dimming part with a changeable transparency locating in front of the eyes; and
   two display members, each display member being located between the dimming part and the eyes and rotatably connecting to one corresponding earphone and capable of rotating to a first position located in front of the eyes and a second position staggered the eyes, while the dimming part remains in front of the eyes,
   wherein, at the first position, the dimming part is in a light shielding state and the display members project image light to the eyes; at the second position, the dimming part is in a light transmitting state and the display members project the image light to the dimming part, which allows the user to see external scenes and the projected image.

2. The head-mounted electronic device according to claim 1, wherein at least one of the two earphones is provided with a touch device for controlling the head-mounted electronic device, and the touch device is arranged on a side wall of the at least one earphone opposite to another.

3. The head-mounted electronic device according to claim 1, wherein the covering member is the C-shaped, and comprises an upper part, a lower part and a middle part; the upper part is adjacent to forehead of the user, the lower part is far away from the forehead, and the middle part locates between the upper part and the lower part and protrudes outwards in a direction of departing away from the earphones.

4. The head-mounted electronic device according to claim 3, wherein a middle position of the lower part is concaved to the middle part and forms one notch.

5. The head-mounted electronic device according to claim 1, wherein the covering member comprises one dimming part extending from the front of a left eye to the front of a right eye of the user.

6. The head-mounted electronic device according to claim 1, wherein the covering member comprises two dimming parts respectively locating in front of left and right eyes of the user and a connecting member, the connecting member connects the two dimming parts and performs no dimming function.

7. The head-mounted electronic device according to claim 1, wherein the covering member comprises:
   two connecting parts respectively connecting with the two earphones; and
   two adjusting parts respectively connecting one of the connecting parts and the dimming part, each adjusting part is configured to adjust a length of the covering member by adjusting a distance between the corresponding connecting part and the dimming part.

8. The head-mounted electronic device according to claim 7, wherein each earphone comprises a cylinder-shaped wall, each connecting part is ring-shaped and sleeved over the cylinder-shaped wall.

9. The head-mounted electronic device according to claim 1, wherein the covering member further comprises at least one contact member, and the at least one contact member contacts with face of the user.

10. The head-mounted electronic device according to claim 9, wherein the at least one contact member further prevents external lights from entering the eyes of the user.

11. The head-mounted electronic device according to claim 1, wherein the dimming part is made from an electrochromic element or a liquid crystal display screen, and the liquid crystal display screen comprises a transparent TTF base.

12. The head-mounted electronic device according to claim 1, wherein each earphone comprises one mounting part, each display member comprises one case and an optical display module accommodated in the case, a side of the case rotatably connects to the mounting part, and an opposite other side defines at least one light outlet to let light emitted from the optical display module to pass through.

13. The head-mounted electronic device according to claim 12, wherein each earphone further comprises one power source disposed to the mounting part, the case connects to the power source and rotates under driving of the power source.

14. The head-mounted electronic device according to claim 12, wherein the at least one light outlet comprises one first light outlet facing towards user face and one second light outlet facing towards forehead or jaw of the user, and the first light outlet and the second light outlet are defined in another side of the case.

15. The head-mounted electronic device according to claim 14, wherein the optical display module comprises one image source, one first lens module, one rotatable refractive lens module, one second lens module and one third lens module; the image source, the first lens module, the refractive lens module and the second lens module are in sequence located in a first light path formed by light emitted through the first light outlet, the image source, the first lens module, the rotated refractive lens module and the third lens module are in sequence located in a second light path formed by light emitted through the second light outlet.

16. The head-mounted electronic device according to claim 2, wherein the dimming part is made from an electrochromic element or a liquid crystal display screen, and the liquid crystal display screen comprises a transparent TTF base.

17. The head-mounted electronic device according to claim 1, wherein each of the two display members is a projector rotatably connected to the one corresponding earphone.

18. The head-mounted electronic device according to claim 1, wherein, at the first position, the image lights emergent from the display members are directly projected to the eyes without being reflected or refracted between the display members and the eyes.

19. The head-mounted electronic device according to claim 1, wherein, at the second position, the dimming part is located in front of the display members and the eyes, and the image lights emitted from the display members are projected along a direction from the eyes towards the dimming part.

20. The head-mounted electronic device according to claim 19, wherein, at the second position, the image lights projected from the display members are reflected by the dimming part to the eyes.

* * * * *